United States Patent
Edrenkin et al.

(10) Patent No.: US 10,986,225 B2
(45) Date of Patent: Apr. 20, 2021

(54) CALL RECORDING SYSTEM FOR AUTOMATICALLY STORING A CALL CANDIDATE AND CALL RECORDING METHOD

(71) Applicant: i2x GmbH, Berlin (DE)

(72) Inventors: Ilya Edrenkin, Berlin (DE); Evgenii Khamukhin, Berlin (DE); Evgenii Kazakov, Berlin (DE); Stefan Decker, Berlin (DE)

(73) Assignee: I2X GMBH, Berlin (DE)

( * ) Notice: Subject to any disclaimer, the term of this patent is extended or adjusted under 35 U.S.C. 154(b) by 0 days.

(21) Appl. No.: 16/262,082

(22) Filed: Jan. 30, 2019

(65) Prior Publication Data
US 2020/0120207 A1 Apr. 16, 2020

(51) Int. Cl.
*H04M 3/42* (2006.01)
*G06N 3/04* (2006.01)
*G10L 25/24* (2013.01)
*G10L 25/51* (2013.01)
*G06N 3/08* (2006.01)

(52) U.S. Cl.
CPC ......... *H04M 3/42221* (2013.01); *G06N 3/04* (2013.01); *G06N 3/08* (2013.01); *G10L 25/24* (2013.01); *G10L 25/51* (2013.01)

(58) Field of Classification Search
CPC . G06N 3/04; G06N 3/08; G10L 25/24; G10L 25/51; H04M 3/42221
USPC .................. 370/259–271, 351–357; 379/85; 455/412.1–420; 709/201–207, 217–248
See application file for complete search history.

(56) References Cited

U.S. PATENT DOCUMENTS

| | | | |
|---|---|---|---|
| 5,168,524 A * | 12/1992 | Kroeker | G10L 15/02 704/254 |
| 8,180,027 B1 * | 5/2012 | Magnuson | H04M 3/2281 370/352 |
| 9,112,974 B1 * | 8/2015 | Wilsie | H04M 3/5175 |
| 9,160,854 B1 * | 10/2015 | Daddi | H04M 3/5175 |
| 10,110,741 B1 * | 10/2018 | Cohen | H04M 3/436 |
| 2003/0112265 A1 * | 6/2003 | Zhang | G06F 16/745 715/723 |
| 2005/0159942 A1 * | 7/2005 | Singhal | G10L 25/48 704/219 |

(Continued)

OTHER PUBLICATIONS

Extended European Search Report for EP Patent Application No. 18200385.5, dated Mar. 29, 2019.

*Primary Examiner* — Hemant S Patel
(74) *Attorney, Agent, or Firm* — Foley & Lardner LLP

(57) ABSTRACT

Embodiments of the present disclosure describe a call recording system and a call recording method for automatically recording, i.e. storing, a call candidate when an active call is detected. The call recording system comprises a sound receiver to receive sound data and to convert sound data to audio representations of sound, a buffer to buffer the audio representations of sound for a predetermined time duration, a call candidate determination unit to determine if the buffered audio representations comprise a call candidate, a call analyzer to analyze the call candidate, wherein the call analyzer determines if the call candidate is a call to be stored, and a storage to store the call candidate as a call. Hence, a reliable system can be provided for automatically storing a call.

15 Claims, 13 Drawing Sheets

(56) References Cited

U.S. PATENT DOCUMENTS

| | | | |
|---|---|---|---|
| 2008/0195387 A1* | 8/2008 | Zigel | G10L 17/06 704/236 |
| 2012/0155655 A1* | 6/2012 | Parkhomenko | H04R 3/00 381/56 |
| 2013/0083904 A1* | 4/2013 | Anderson | G10L 15/265 379/88.08 |
| 2015/0120292 A1* | 4/2015 | Konchitsky | G10L 25/81 704/233 |
| 2016/0117593 A1 | 4/2016 | London | |
| 2018/0007199 A1* | 1/2018 | Quilici | H04M 15/06 |
| 2019/0220748 A1* | 7/2019 | Denil | G06N 3/0445 |

* cited by examiner

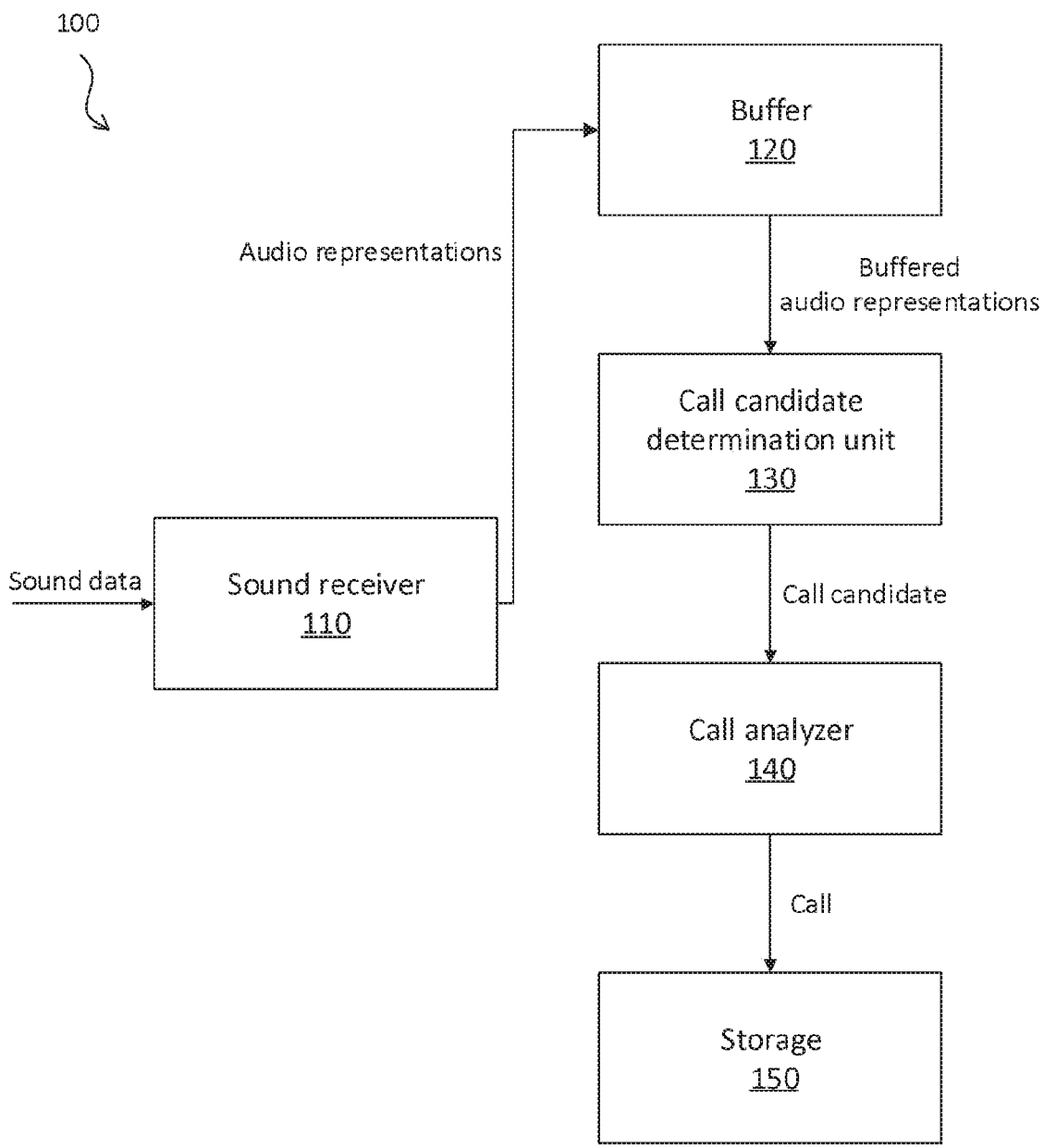

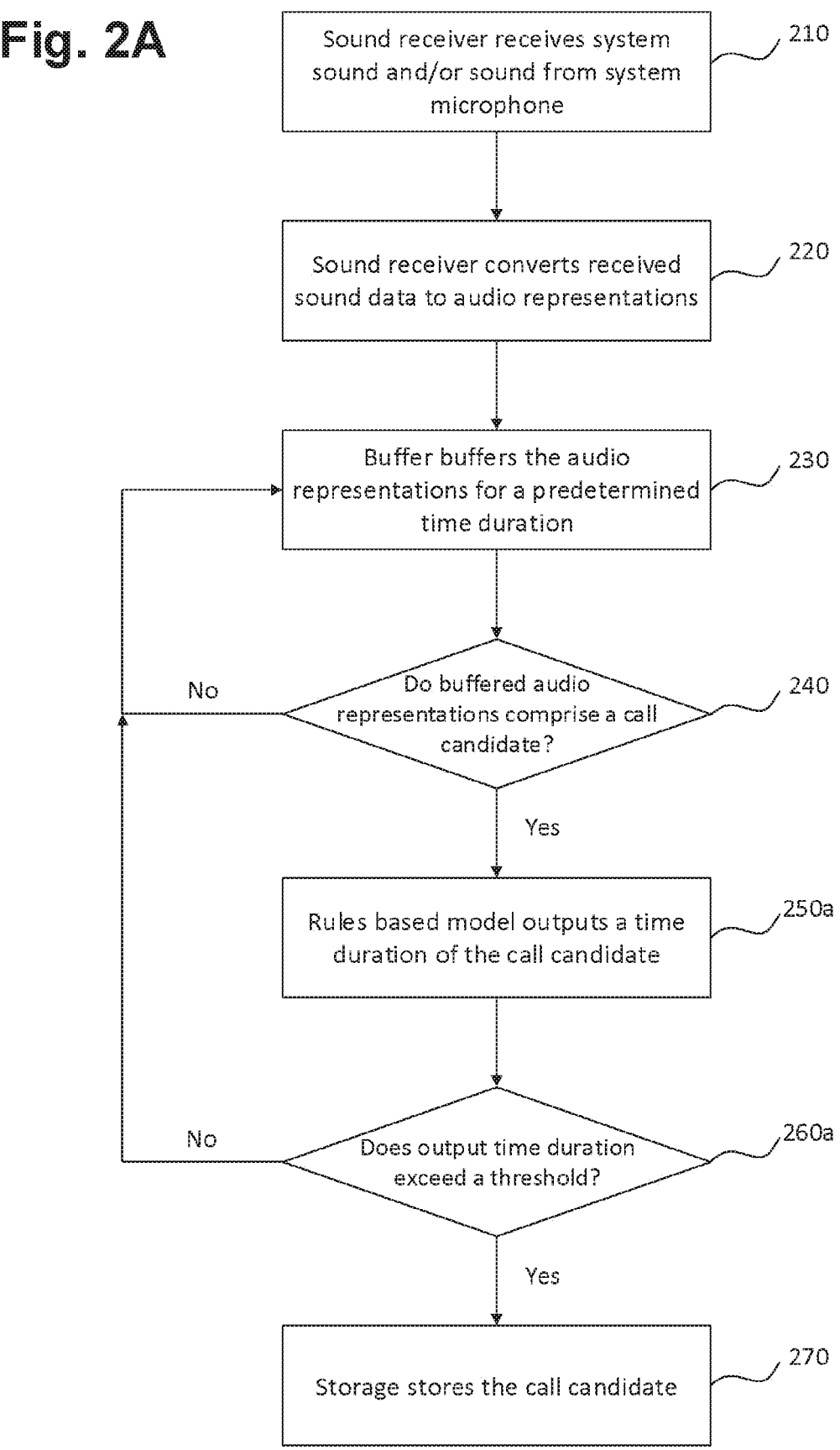

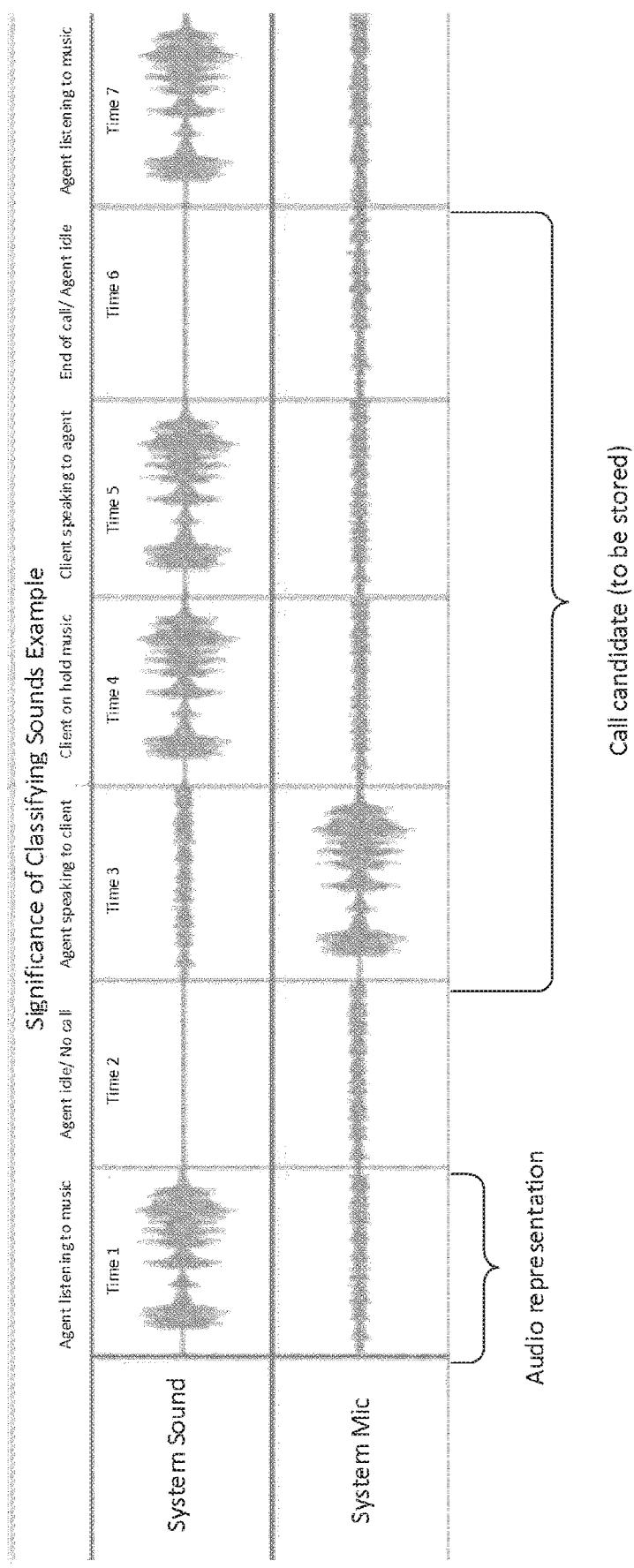

CALL RECORDING SYSTEM FOR AUTOMATICALLY STORING A CALL CANDIDATE AND CALL RECORDING METHOD

CROSS-REFERENCE TO RELATED APPLICATION

The present application claims priority to and the benefit of European Patent Application No. 18200385.5, titled "CALL RECORDING SYSTEM FOR AUTOMATICALLY STORING A CALL CANDIDATE AND CALL RECORDING METHOD," and filed Oct. 15, 2018, the contents of which are hereby incorporated herein by reference in its entirety for all purposes.

BACKGROUND

The present invention relates to automatically recording of a call candidate when an active call is detected. In particular, the present invention relates to a call recording system and a call recording method for automatically recording, i.e. the storing, of a call candidate when an active call is detected.

Recording calls over a Voice over Internet Protocol (VoIP) network is for example essential in a call center environment, medical, legal, health, or finance industries. In this matter, for functions that require a high volume of calls, automatically recording of calls is preferred to reduce human error and labor.

Automatically recording, i.e. storing, of calls when a call is detected over the VoIP network, typically involves 1) integration of a recording function with a VoIP provider; 2) third party Application Programming Interface (API) integration into the VoIP system which usually is performed through port mirroring or hosted services which sniffs the data that passes by; 3) browser-based communication methods; or 4) local recording of clients which are tailored to a specific VoIP service.

However, there are several drawbacks to these existing solutions. One drawback of integrating the recording function with the VoIP provider is that this integration may be quite expensive and may require high barriers to integration and infrastructure. Additionally, the VoIP provider may record at a middle point between multiple calls resulting in a call recording quality reduced to the lowest quality denominator of the multiple calls. In more detail, if one call on the VoIP network has a High Definition (HD) quality connection, but another call has a lower quality connection, the call will be recorded in the lower quality format.

A drawback for third party API integration is that it may be expensive, as it needs to be integrated into a VoIP network. Port mirroring or hosted services may have similar drawbacks to the VoIP integration in having high barriers for installing and configuring the network for recording due to a need on premise hardware for sniffing the packets of data.

Browser-based communication methods may be recorded by a browser provider (e.g. WebRTC) which is limited to only recording the one browser method without being able to record across platforms and integrate all recordings into one place.

Local recording clients that are tailored to specific VoIP services, like Skype, have similar drawbacks compared to the browser-based communication methods, as they are limited to only recording the one service and at an additional cost.

Moreover, all of these methods mentioned above consume an increased load of bandwidth as communication with a server is required for recording.

Other methods for automatically detecting and recording calls which are described in the prior art include speech analysis methods where keywords are detected to trigger a recording. This requires analyzing all calls by using a transcription service with the drawback of a large amount of processing power to transcribe and then to analyze the individual words of a text. Local systems without sufficient processing capabilities may not be able to automatically detect and record calls with speech analysis methods, such that communication with an external server may be needed resulting in the usage of large bandwidth.

Therefore, it is a challenge to automatically detect a possible call, a candidate for a call, on the VoIP network and then to automatically record, i.e. store, the call candidate if the call candidate is a call to be stored. Moreover, it is a challenge to provide a call recording system and method which can run locally on a system, i.e. machine, without much processing power. Accordingly, it is desired to provide a call recording system and method which does not need to be integrated with any other third-party software, while it shall be avoided to generate extra load on the bandwidth of the data being sent from the local machine to the server.

SUMMARY

It is desired to provide means without much processing power for reliably and automatically recording of a call candidate when an active call, i.e. a call to be stored, is detected while preferably avoiding integration with other third-party software and generation of extra load on the bandwidth of data being sent.

At least some of the mentioned objects and drawbacks are solved by the subject matter of the independent claims. Further embodiments are defined in the dependent claims.

According to one aspect of the present solution, a call recording system for automatically storing of a call comprises a sound receiver configured to receive sound data and to convert sound data to audio representations of sound; a buffer configured to buffer the audio representations of sound for a predetermined time duration; a call candidate determination unit configured to determine if the buffered audio representations comprise a call candidate, wherein the buffered audio representations comprise a call candidate if a characteristic of a buffered audio representation exceeds a first predetermined threshold; a call analyzer configured to analyze the call candidate, wherein the call analyzer is configured to output a value of the call candidate and to determine from the audio representations of the call candidate if the output value corresponding to the call candidate exceeds a second predetermined threshold; and a storage configured to store the call candidate as a call if the value of the call candidate exceeds the second predetermined threshold. Accordingly, a call recording system is provided for reliably and automatically recording of a call candidate when an active call is detected.

According to another aspect of the present solution, a call recording method for automatically storing of a call comprises the steps of receiving sound data; converting the sound data to audio representations of sound; buffering the audio representations of sound for a predetermined time duration; determining if the buffered audio representations comprise a call candidate, wherein the buffered audio representations comprise a call candidate if a characteristic of a buffered audio representation exceeds a first predetermined threshold; analyzing the call candidate, wherein the step of analyzing comprises outputting a value of the call candidate and determining from the audio representations of the call candidate if the output value corresponding to the call candidate exceeds a second predetermined threshold; and storing the call candidate as a call if the value of the call candidate exceeds the second predetermined threshold. Accordingly, a call recording method is provided for reliably and automatically recording of a call candidate when an active call is detected.

Further advantageous features of the invention are disclosed in the claims.

BRIEF DESCRIPTION OF THE DRAWINGS

FIG. 1A is an illustration of a call recording system for automatically storing of a call according to an embodiment.

FIG. 2A is an illustration of a method for automatically storing of a call, wherein a rules based model is used to analyze a call candidate.

FIG. 6A is an illustration of audio representations and call candidates to be stored in relation to system sound samples and system microphone (mic) samples.

DETAILED DESCRIPTION

Embodiments of the present solution are described with reference to the figures. It is noted that the following description contains examples only and should not be construed as limiting the invention. In the following, similar or same reference signs indicate similar or same elements or functions.

Embodiments of the present solution generally refer to automatically storing a call if it determined as active. This includes determining if buffered audio representations comprise a call candidate, analyzing the call candidate to obtain a value associated with a probability that the call is active and determining if the output value exceeds a threshold. If this is the case, the value of the call candidate is stored as a call.

Figure 1B:
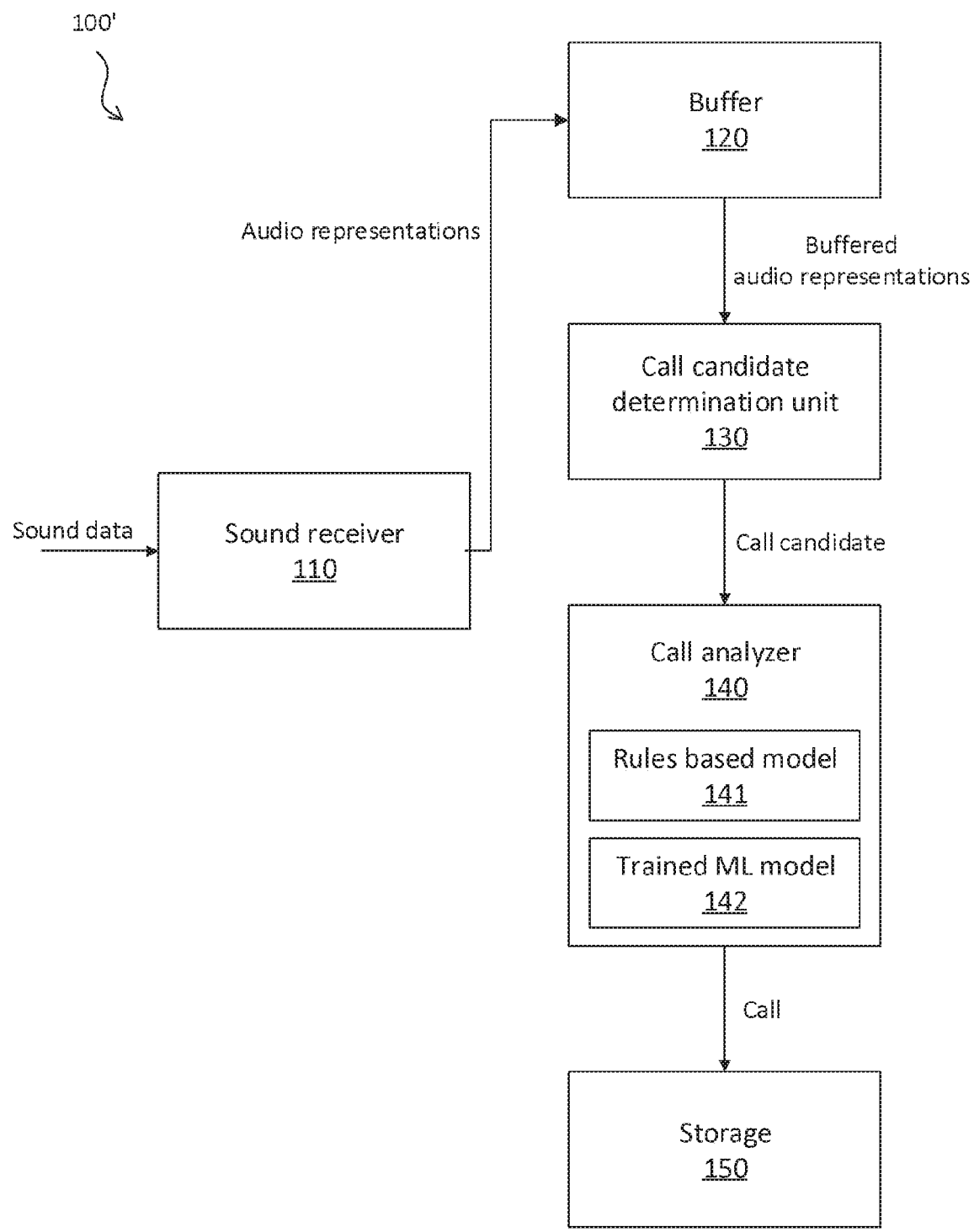
FIG. 1B is an illustration of another call recording system in more detail according to another embodiment.
Figure 1C:
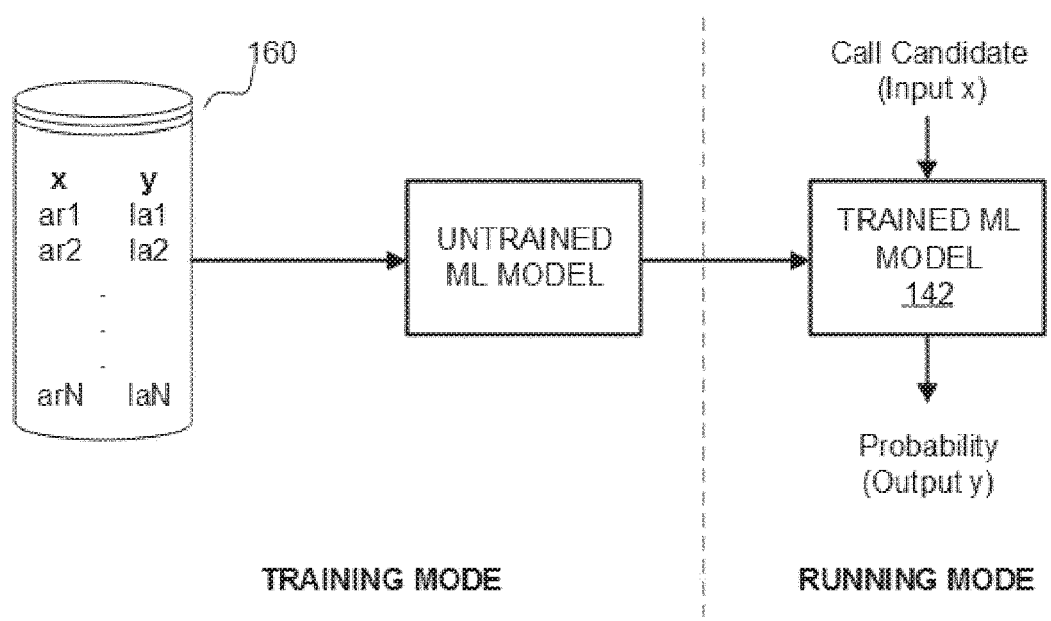
FIG. 1C is an illustration of a trained Machine Learning, ML, model in training mode and running mode.

Reference is made to FIGS. 1A, 1B, and 1C, which illustrate a call recording system for automatically storing of a call and an overview of a training mode and a running mode of a Machine Learning (ML) model, and their interaction. The call recording system is not limited to any particular type. The call recording system may run on, for example, a personal computing device, such as a desktop computer or laptop computer, or server system.

As illustrated by FIG. 1A, the call recording system 100 may comprise a sound receiver 110, a buffer 120, a call candidate determination unit 130, a call analyzer 140, and a storage 150. More details with respect to the call recording system 100 are given below.

The sound receiver 110 may receive sound data, wherein the sound data may represent system sound or system microphone (mic) sound which is sound from a system microphone. System sound or system mic sound may be generated by music, voices from a conversation, video streams, error messages of a personal computing device including the call recording system 100, etc. System sound may be thereby received e.g. as Internet Protocol (IP) packets over a Voice over IP (VoIP) network, may be generated by error messages generated on the personal computing device including the call recording system 100, may be generated by playing music on the personal computing device, etc. A user, i.e. an agent, using the personal computing device including the call recording system 100 may hear system sound over speakers or a headset connected to the personal computing device.

In contrast to system sound, system mic sound is sound input from the system microphone of for example the personal computing device including the call recording system 100. System mic sound may be generated by the user, i.e. the agent, using the personal computing device and speaking into its microphone. In addition, system mic sound may be generated by the user, i.e. the agent, speaking into the microphone of a headset connected to the personal computing device.

As illustrated in FIG. 1A, the sound receiver 110 then converts the received sound data to audio representations of sound. An audio representation of sound is a general and uniform representation of system sound and system mic sound, i.e. a uniform data format representing waveform "snippets" of the corresponding voice samples, music samples, video samples, error messages, etc. For example, an audio representation may be a specific file format representing an audio waveform.

The buffer 120 is adapted to receive the audio representations from the sound receiver 110 and buffer the audio representations for a predetermined time duration. For example, the buffer 120 is a Random Access Memory (RAM) and the audio representations are continuously buffered to the RAM of a personal computer, like the personal computing device including the call recording system 100. In one example, the length of the buffer time can be determined by the computing device hardware capabilities and an average length of call time. Usually the typical buffer time length to buffer each audio representation is between 10 to 100 seconds.

Instead of buffering the audio representations to the RAM, it is also possible to stream the audio representations directly from an online application to a remote system for buffering.

Afterwards, as illustrated in FIG. 1A, the call candidate determination unit 130 determines if the buffered audio representations comprise a call candidate. The buffered audio representations comprise a call candidate if a characteristic of a buffered audio representation exceeds a predetermined threshold. For example, the characteristic of the buffered audio representation indicates the intensity of the sound corresponding to sound data. For example, the characteristic of the buffered audio representation may be the intensity of the sound, for example, determined by detecting the height of the amplitude or an integral over time of the amplitudes of the audio representation which may resemble a waveform and which corresponds to the sound data. If the mean amplitude of the buffered audio representation is for example greater than the value 0 (value 0 being the predetermined threshold), it is determined that actual sound, and not silence, is detected. Hence it may be assumed that the buffered audio representations comprise a call candidate. In this matter, a call candidate may consist of at least one audio representation.

In summary, the call candidate determination unit 130 distinguishes between actual sounds, like music, conversations (conversational sound), video streams, etc., on the one hand and silence, noise, etc., on the other hand, and outputs a call candidate comprising at least one audio representation when actual sound is determined.

The call analyzer 140 then analyzes the call candidate in more detail by analyzing the characteristics of the call candidate and outputting a value based on the characteristics. In particular, the call analyzer 140 determines if the call candidate is actually an active call to be stored. An active call is a call comprising content to be stored, for example a conversation between two parties or the voice of one party speaking, which should be stored, compared to music or video streams which should be discarded.

A more practical example is a doctor's office in which the doctor wishes to store all active calls comprising conversations between the doctor and a patient. A call candidate solely indicates that sound data is detected in the call recording system, while a call, i.e. an active call, indicates content to be stored, i.e. a person speaking.

Based on the analysis of the call candidate, the call analyzer outputs a value, that is, giving an indication whether the call is a call to be stored (active call). For instance, for the practical example of the doctor's office, the characteristics of the call candidate may be the time duration of the call candidate, wherein the characteristics are output as value of the call analyzer. A call candidate lasting for a longer time duration may be an active call to be stored, as it is very likely that this call candidate represents a conversation between the doctor and a patient.

This example shows that if the output value corresponding to the call candidate exceeds a predetermined threshold, the call candidate is a call, i.e. an active call, and is stored by the storage 150. The output value is adapted to the used classification model, i.e. for instance a rules based model or a trained ML model, included in the call analyzer 140 which is described in more detail with regard to FIGS. 1B and 2A to 2C.

If the audio representations are buffered on a remote system, the call candidates may also be streamed to a server for analyzing the call candidate on a remote system instead of analyzing the call candidate on for example the personal computing device. Accordingly, instead of integrating and hardwiring components in a single computing device, the components of the call recording system 100 may be distributed remotely in a network, e.g. a sound receiver may transmit data to a remote buffer which is wirelessly connected or connected by wire with a call candidate determination unit placed remotely from a call analyzer and a storage which may be cloud-based.

As already described above, the storage 150 stores the call candidate as a call, i.e. an active call, if the value of the call candidate exceeds the predetermined threshold set in the call analyzer 140. With this setting solely active calls including content to be stored, like conversations, are recorded, i.e. stored, in the storage 150. The calls may be stored locally on, for example, the personal computing device for confidential reasons or may be stored in a cloud system. The active call may also be sent to a cloud system or remote server in real-time for further processing. The further processing may be performed on a remote server if the personal computing device does not have the processing power required to perform potential applications.

FIG. 1B shows a call recording system 100' based on the call recording system 100 of FIG. 1A, and particularly explains details of the call analyzer 140 which may comprise a rules based model 141 or a trained ML model 142 or in an embodiment a rules based model 141 and a trained ML model 142. The rules based model 141 and the trained ML model 142 are described in more detail below.

The rules based model 141 is preferably used for environments where the types of system sounds that are to be detected are predictable and predetermined. Thus, the rules based model 141 is mostly used in cases where less computing power on the computing device storing the call recording system 100' is available and the environment in which the call recording system 100' functions is kept quite simple which means that the environment can be defined with few rules.

The rules based model 141 may be customized on a per case basis depending on the requirements and environments that the call recording system 100' is applied to. For instance, the rules based model 141 may be applied to detecting a Dual-Tone Multi Frequency (DTMF) code on outgoing calls, such that the rules based model 141 may be implemented in contexts where there are only outgoing calls, like in an outbound call center.

Another example is that the rules based model 141 may be used to capture system sound on the target machine, like the personal computing device including the call recording system 100', which may be configured to solely playing system sounds and making calls. The call candidates are filtered in view of time duration to differentiate between a call candidate being an active call including conversation, and a call candidate being operating system sounds, like error messages. In this case, the call analyzer 140 having the rules based model 141 outputs a time duration as the value of the call candidate and compares the time duration to a predetermined threshold, e.g. a preset time duration, to determine whether the output time duration exceeds the preset time duration. If an error message is for example never longer than 5 seconds, the call analyzer 140 classifies the call candidate as a call if the output time duration of the call candidate is greater than 5 seconds. The call analyzer 140 including the rules based model 141 is able to easily and quickly determine if the call candidate corresponds to an error message output on a computing device, like the personal computing device including the call recording system 100'. The storage 150 then stores the call candidate as a call, i.e. an active call, if the time duration of the call candidate exceeds the threshold of 5 seconds, i.e. if the call candidate is not an error message.

Coming back to the example regarding the DTMF code, the DTMF codes can be detected to determine the beginning of an active call. In this case, the call recording system 100, 100' may be integrated with DTMF recognition software which determines if the system sound being received is recognized by the recognition software. If the system sound is actually recognized by the recognition software, call recording is triggered and the recording commences.

In summary, the call analyzer 140 having the rules based model 141 is an easy and fast approach to analyze a call candidate based on simple, basic rules.

If, however, higher accuracy for analyzing a call candidate is desired or if a computing device with greater computing capacity is available, the trained ML model 142 may be used in the call analyzer 140 together or without the rules based model 141. For cases where the computing device, like the personal computer, plays multiple sounds, or the types of system sounds that are to be detected are unpredictable, a more complex model, like the trained ML model 142, is desired to differentiate between multiple possible systems sounds. The trained ML model 142 may be stored locally on for example the personal computing device or may be stored non-locally in a cloud based system. The advantage of storing the trained ML model 142 locally means the processing can happen without generating extra load on the bandwidth of the data being sent from the local machine to a server or cloud.

In more detail, the trained ML model 142 is a probabilistic model which may take the form of a conditional probability model or a joint probability model which can be implemented by using conventional libraries. The trained ML model 142 has been trained on many input-output pairs to create an inferred function that maps an input to an output which is understood as supervised learning. The input of each input-output pair may be an audio representation of sound data stored in a database, and the output may be a specific label. The label indicates the type of sound data, i.e. the type of audio representation. There may be a label "music" indicating music being played when a user is placed on hold for example, or a label "conversation" indicating a person speaking during a conversation between two parties.

During a running mode, the trained ML model 142 outputs a probability according to a received audio representation. Each probability of an audio representation indicates a similarity between the received audio representation and the label stored during the training mode. For instance, if in a running mode an audio representation is received as input, the trained ML model 142 outputs a probability for each of the possible labels that are normalized to add up to 100%. The probabilities for each label indicate to which label, and the data of this label used in training mode, the input is most similar. The label which scores the highest probability is selected as the label for the audio representation. For example, if the probability output is 5% for "voice", 5% for "noise", and 90% for "music", "music" is used as label. The probability can be understood as the similarity between the newly received audio representation during the running mode and the audio representation indicating a specific type of sound data during the training mode.

In view of FIG. 1C, the trained ML model 142 is trained during a training mode. In the training mode shown on the left side of FIG. 1C, the trained ML model 142 has been trained on a training set of a plurality of audio representations including call candidates associated with labels, wherein the labels indicate which audio representations are to be stored and which are not to be stored. In more detail, during the training mode, a database 160 stores a plurality of audio representations ar1, arN corresponding to training audio representations and a plurality of labels 1a1, . . . 1aN corresponding to the audio representations. An untrained ML model accesses the database and is trained on the input-output pairs (x,y) of the audio representations being the input and the corresponding labels, such as "music", "conversation", "error message", etc., being the output.

During the training mode, to train the ML model, inputs of audio representations may be preprocessed into Mel-frequency cepstral coefficients (MFCCs) which may be regarded as MFCC audio representations. The preprocessing may be performed by any type of audio editing software including commercially available products and open source audio editing libraries. The ML model may comprise a Convolutional Neural Network (CNN) such that the audio sample MFCCs may be input along with a label associated with the type of sound data for obtaining the trained ML model 142 including the CNN. For instance, if an audio sample MFCC of music was input into the CNN, then the label input would be "music". The preprocessing into MFCC is optional and the ML model can be also trained on input-output pairs of audio representations and labels without preprocessing the audio representations.

With a large enough dataset, the trained ML model 142 with, for example, an underlying CNN may be able to output a probability of the type of sound data being input. The sound data is thereby represented by a uniform data format, i.e. the audio representation. The larger the dataset for training the ML model has been, the larger the accuracy for determining a classification associated with a new input audio sample. With multiple labels and associated audio samples having been input into the CNN, the trained ML model 142 is capable of distinguishing between different types of audio samples representing different types of sound data by outputting a probability of that audio representation. The types of sound data may include conversation, music, video stream, operating system sounds like error message sound, gaming, software applications, podcasts, etc.

After the ML model has been trained, the running mode is performed. During the running mode, the trained ML model 142 receives audio representations corresponding to sound data which are usually different from the training audio representations of the training mode. The audio representations may be of different types of sound data and must therefore be classified by the trained ML model 142 to be able to decide whether the audio representations comprise an active call to be stored. For classification, the trained ML model 142 is able to determine and output the probability of each input audio representation as the output value of the call candidate of the call analyzer 140 in combination with the specific label corresponding to each audio representation. As described above, each probability of an audio representation indicates the similarity between the audio representation input in the trained ML model 142 and the audio representation of a specific label stored during the training mode. A probability of 95% would mean that the received audio representation is almost the same as a training audio representation representing a specific label. In other words, a higher probability of a received audio representation may most likely mean a more similar representation compared to a training audio representation representing a specific label. For example, one audio representation in a call candidate with a probability of 90% for the label "conversation" indicates that the call candidate is most likely a conversation and thus an active call.

In an example, if the call candidate has different audio representations, the probabilities of the audio representations are received in a specific sequence and a rules set of the call analyzer 140 is applied to determine if that specific sequence, i.e. the call candidate, is an active call. For example, in a first case, if the sequence of probabilities of audio representations solely contains probabilities of 95% "music", the call analyzer 140 determines that this sequence, i.e. call candidate, is not a call. If, however, in a second case, the sequence of probabilities of audio representations contains probabilities of 95% "conversation" and probabilities of 95% "music", the call analyzer 140 determines that this sequence is a call with one party being placed on hold from time to time during the conversation. Thus, in the second case the sequence being one call candidate is determined to be an active call which is stored by the storage 150.

In another example, instead of outputting one probability of the input audio representation, the trained ML model 142 may determine the most likely probabilities of the audio representation. For example, the trained ML model 142 may determine the probabilities 95% "music", 1% "conversation", 1% "noise", and 3% "silence" for the input audio representation. Then the trained ML model 142 may determine the highest probability of the audio representation and may output the highest probability as the classification of the audio representation. Thus, in the described example, the audio representation is classified to be 95% "music". The trained ML model 142 may always attempt to determine an output value of an input audio representation even if the probabilities for one audio representation are 33% "music", 32% "conversation", 32% "silence", and 3% "noise". In this case, the trained ML model 142 outputs 33% "music" for the input audio representation.

Figure 5:
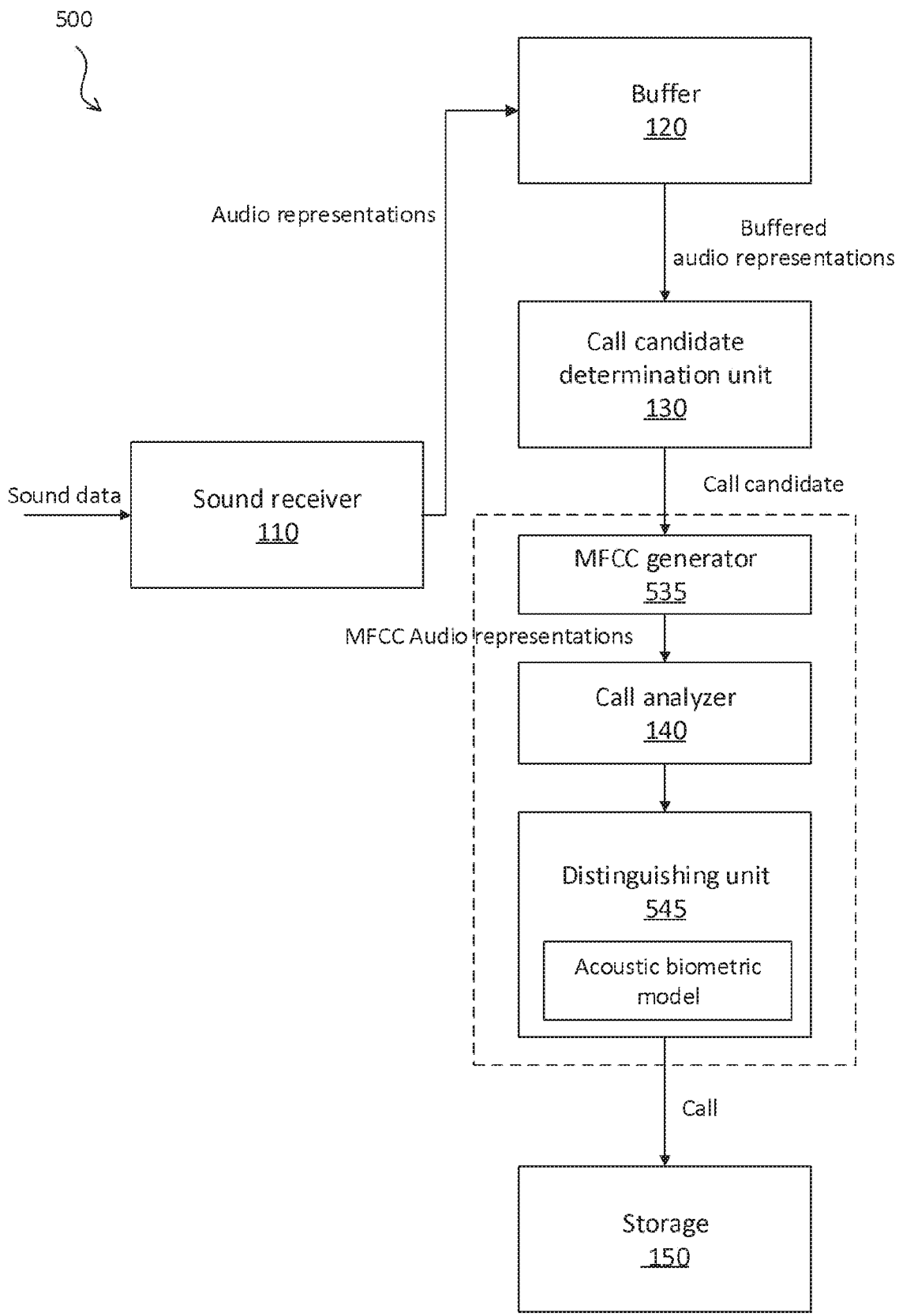
FIG. 5 is an illustration of the call recording system for automatically storing of a call, the call recording system further including a MFCC generator and a distinguishing unit with an acoustic biometric model.

If the audio representations have been preprocessed into MFCCs during the training mode, the audio representations also have to be preprocessed in the running mode by a MFCC generator 535 shown in FIG. 5. FIG. 5 is described in more detail further below.

In this embodiment, the trained ML model 142 can categorize different types of audio representations, i.e. sound data, from each other, rather than just determining a binary call or a non-call category. If a probability output of an audio representation suggests a strong chance of music, the call candidate can still be an active call with on-hold music being played when one party of a conversation is placed on hold. If a binary call category were used, it would be impossible to categorize music as that could be both a call or non-call audio sample.

Figure 2B:
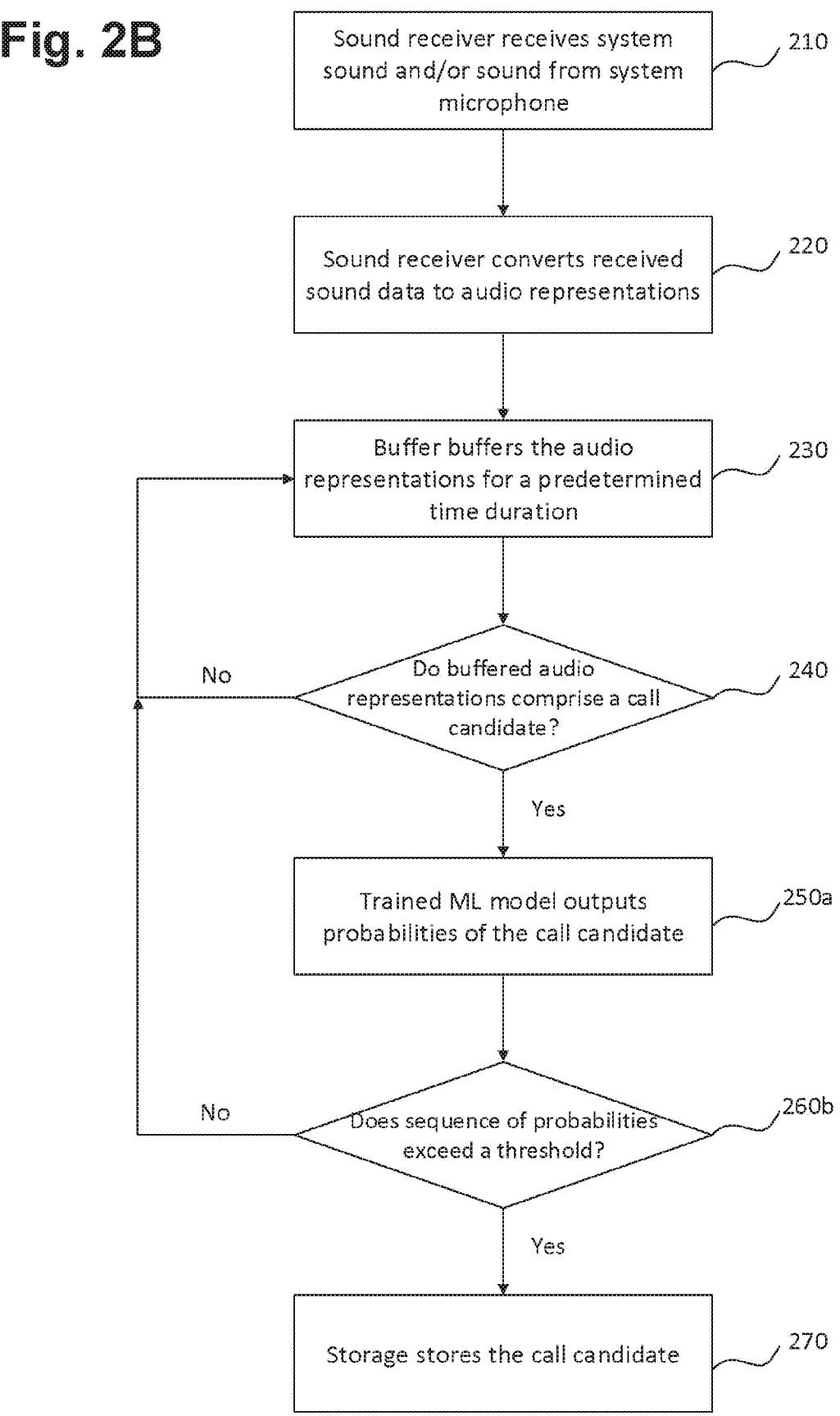
FIG. 2B is an illustration of a method for automatically storing of a call, wherein a trained ML model is used to analyze the call candidate.
Figure 2C:
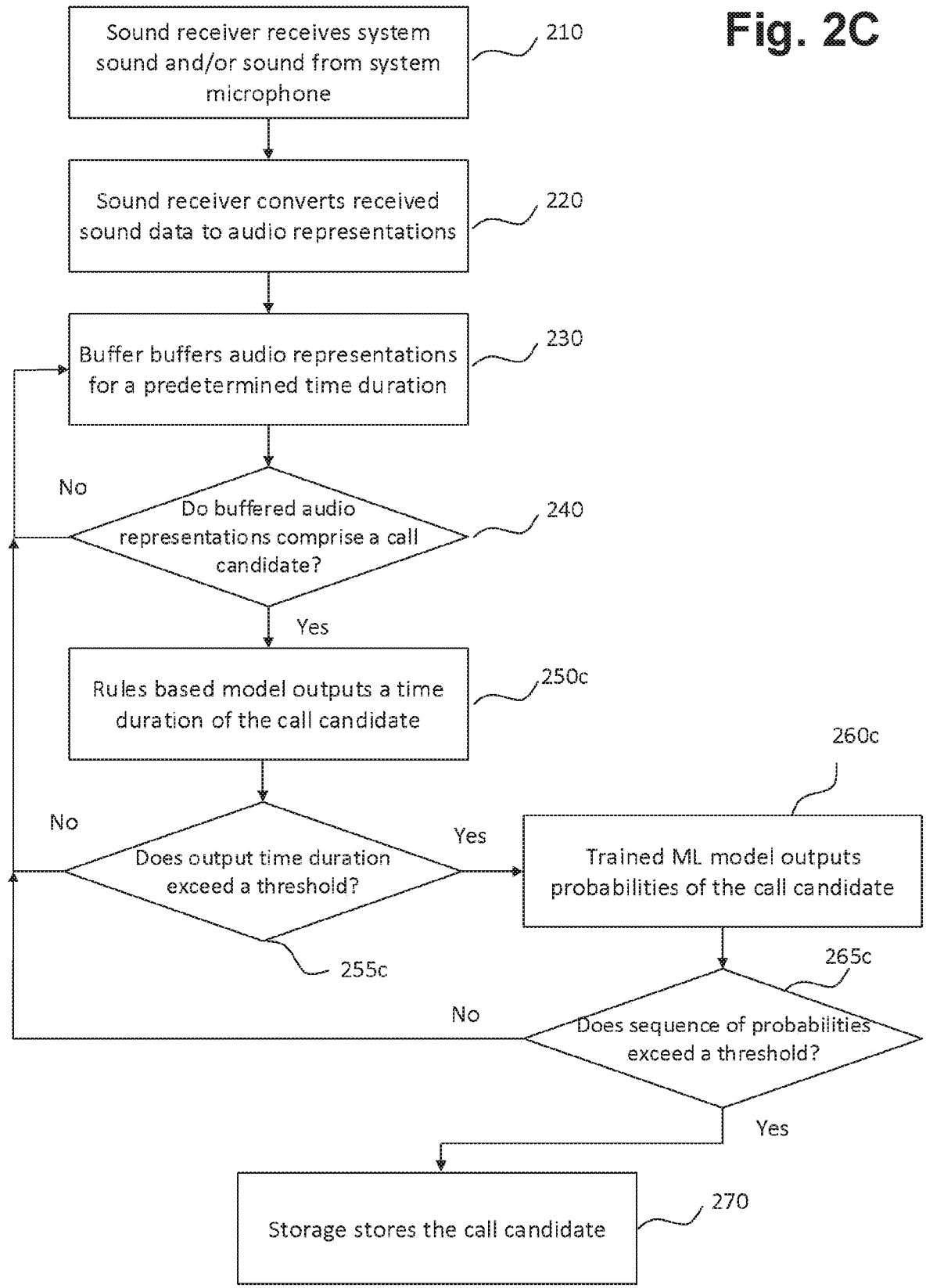
FIG. 2C is an illustration of a method for automatically storing of a call, wherein a rules based model and a trained ML model are used sequentially to analyze the call candidate.

FIGS. 2A to 2C illustrate call recording methods for automatically storing of a call. Starting with FIG. 2A, which shows the call recording method with the call analyzer 140 using the above-discussed rules based model 141, the sound receiver 110 receives system sound and/or system mic sound at step 210 of the call recording method.

At step 220, the sound receiver 110 converts the received sound data to audio representations.

At step 230, the buffer 220 buffers the audio representations for a predetermined time duration.

Afterwards, at step 240, the call candidate determination unit 130 determines if the buffered audio representations comprise a call candidate. For example, this determination is done by analyzing the intensity of the sound data, e.g. by comparing the mean amplitude of the underlying audio representation to a predetermined threshold as described above. If the buffered audio representations do not comprise a call candidate ("No" at step 240), the call recording method goes back to step 230 to regard the subsequent buffered audio representations.

If, however, the buffered audio representations comprise a call candidate ("Yes" at step 240), the rules based model 141 outputs a time duration as the value of the call candidate at step 250a.

At step 260a, if the call candidate is for example an error message and the time duration of the call candidate does not exceed a predetermined threshold ("No" at step 260a), the call recording method goes back to step 230.

If, however, the time duration of the call candidate exceeds the predetermined threshold ("Yes" at step 260a), the call analyzer 140 determines that the call candidate is an active call. At step 270, the storage 150 then stores the call candidate as call.

Now, FIGS. 2B and 2C are described in more detail. As steps 210 to 240 and step 270 of FIGS. 2B and 2C are equal to steps 210 to 240 and step 270 of FIG. 2A, a detailed description of these steps is omitted in the following and it is referred to the explanations above with respect to FIG. 2A.

FIG. 2B illustrates a call recording method, wherein the call analyzer 140 comprises the trained ML model 142. At step 250a, the trained ML model 142 being part of the call analyzer 140 receives a call candidate and outputs probabilities of the underlying audio representations being part of the call candidate as the value of the call candidate.

If the sequence of probabilities of the audio representations output from the trained ML model 142 does not exceed a threshold based on the rules set of the call analyzer 140 as described above ("No" at step 260b), the call recording method goes back to step 230. If, however, the sequence of probabilities output from the trained ML model 142 exceeds a threshold based on the rules set of the call analyzer 140 as described above ("Yes" at step 260b), the call analyzer 140 determines that the call candidate is an active call and goes to step 270.

FIG. 2C illustrates a call recording method, wherein the call analyzer 140 comprises both the rules based model 141 and the trained ML model 142. The two models 141 and 142 are used sequentially to increase the accuracy of the call analyzing step.

At step 250c, the rules based model 141 receives a call candidate and outputs a time duration as the value of the call candidate.

At step 255c, if the time duration of the call candidate does not exceed a predetermined threshold ("No" at step 255c), the call recording method goes back to step 230.

If, however, the time duration of the call candidate exceeds the predetermined threshold ("Yes" at step 255c), the call candidate is passed on to the trained ML model 142.

At step 260c, the trained ML model 142 outputs probabilities of the underlying audio representations being part of the call candidate as the value of the call candidate.

If the sequence of probabilities output from the trained ML model 142 does not exceed a threshold based on the rules set of the call analyzer 140 as described above ("No" at step 265c), the call recording method goes back to step 230. If, however, the sequence of probabilities output from the trained ML model 142 exceeds a threshold based on the rules set of the call analyzer 140 as described above ("Yes" at step 265c), the call analyzer 140 determines that the call candidate is an active call and goes to step 270.

The advantage of using both the rules based model 141 and the trained ML model 142 sequentially in the call analyzer 140 is that the complexity and the duration of the procedure of analyzing call candidates can be reduced. The determination of the rules based model 141 can be interpreted as pre-analysis, as the rules based model 141 is used as coarse classification between error messages and non-error messages. Solely the call candidates being determined as non-error messages are analyzed more precisely by using the trained ML model 142. Thus, the complexity of the trained ML model 142 can be reduced as one part of the analysis is outsourced to the rules based model 141. In addition, the duration for analyzing the call candidates can be reduced as the rules based model 141, which does not consume much time due to its basic rules, carries out one part of the analysis simplifying and accelerating the classification for the trained ML model 142.

Figure 3:
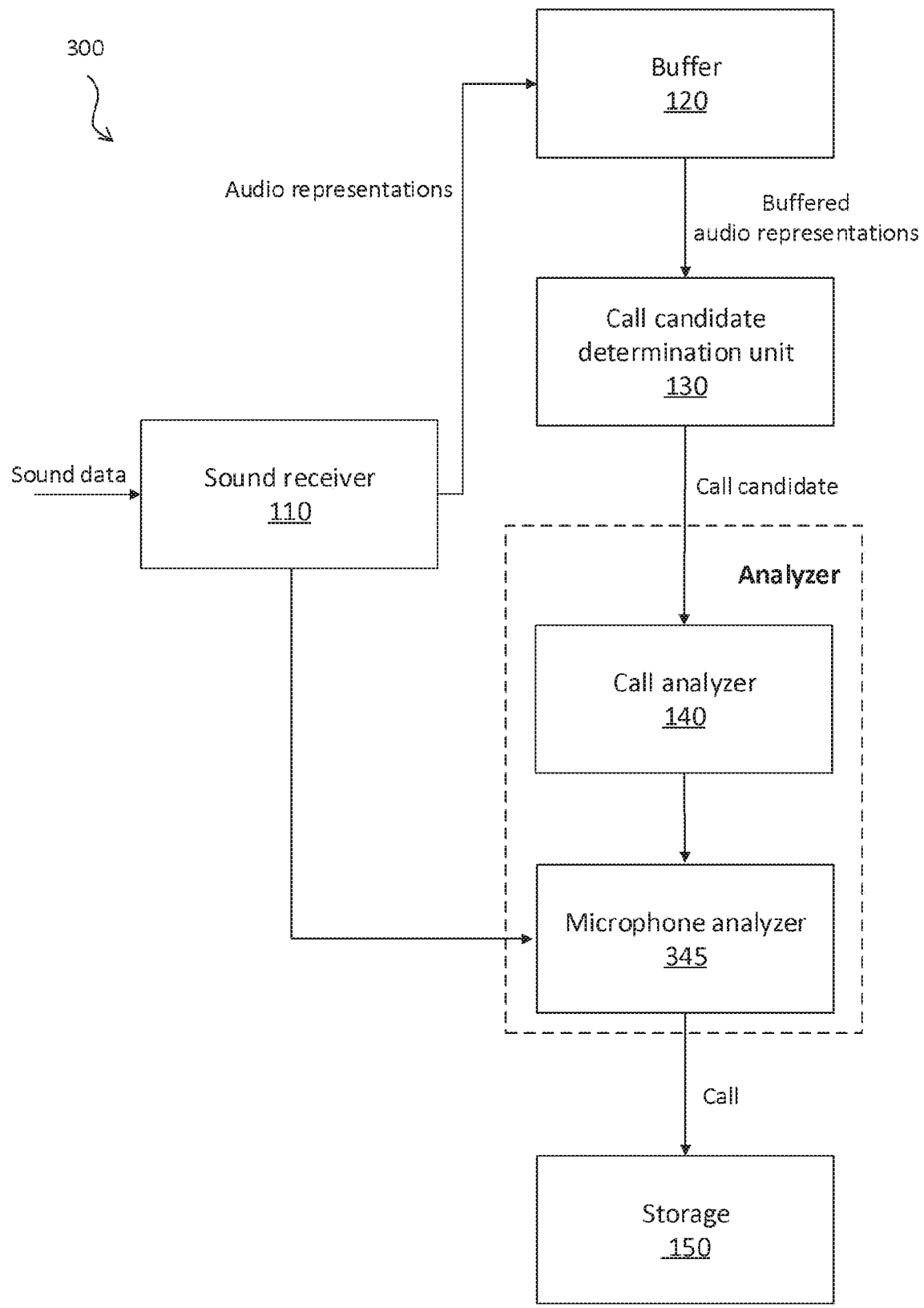
FIG. 3 is an illustration of a call recording system for automatically storing of a call according to another embodiment.

FIG. 3 illustrates another call recording system 300, wherein the sound receiver 110, buffer 120, call candidate determination unit 130, call analyzer 140, and storage 150 of call recording system 300 are equal to the sound receiver 110, buffer 120, call candidate determination unit 130, call analyzer 140, and storage 150 of call recording system 100 as described with regard to FIGS. 1A and 1B. Thus, a detailed description of the functions of the sound receiver 110, buffer 120, call candidate determination unit 130, call analyzer 140, and storage 150 of call recording system 300 is omitted at this point.

The difference between the call recording system 300 and the call recording system 100, 100' is that the call recording system 300 further comprises a microphone analyzer 345. The microphone analyzer 345 can be placed anywhere in the call recording system 300, but for further description the microphone analyzer 345 is placed between the call analyzer 140 and the storage 150.

The microphone analyzer 345 may be interpreted as an additional monitoring unit which determines if a call candidate includes a two way conversation when the call analyzer 140 outputs a high probability of the call candidate being a call, i.e. an active call. If the call analyzer 140 determines that the call candidate is an active call, the microphone analyzer 345 refers to the system microphone to determine if sound data is generated by the system microphone. If it is determined that sound data is input to the sound receiver 110 from the system microphone, the likelihood that a call candidate is actually a call to be stored is increased.

For instance, it may be difficult to determine whether a call candidate refers to a video stream containing a conversation or whether the call candidate refers to an actual conversation between two parties. Without another reference there is no certainty that the call candidate being analyzed by the call analyzer 140 is an active call or a video stream, section of a song, podcast, etc. Thus, the microphone analyzer 345 is used as an additional reference, i.e. monitoring unit, to increase the accuracy of analyzing call candidates.

If the microphone analyzer 345 does not detect system mic sound received by the sound receiver 110, there is a high chance that the conversation determined by the call analyzer 140 is actually a video stream. A conversation between two parties is usually characterized in that two participants speak one after the other. Thus, system sound may be received over the VoIP network and may represent one person talking, while system mic sound may be received from the user sitting in front of the personal computing device including the call recording system 300 and talking into the system microphone.

In summary, the microphone analyzer 345 may function as an additional monitoring device monitoring and adjusting the analyzing results of the call analyzer 140 for higher accuracy.

To determine conversation activity on the microphone, a WebRTC voice activity detection library may be integrated into the call recording system 300 and the system microphone. When the call recording system 300 determines a high likelihood of a call candidate being a call, i.e. an active call, referring to both probabilities of conversation from the system microphone and system sounds sources, the call recording system 300 automatically triggers the call candidate to be stored as active call.

Figure 4:
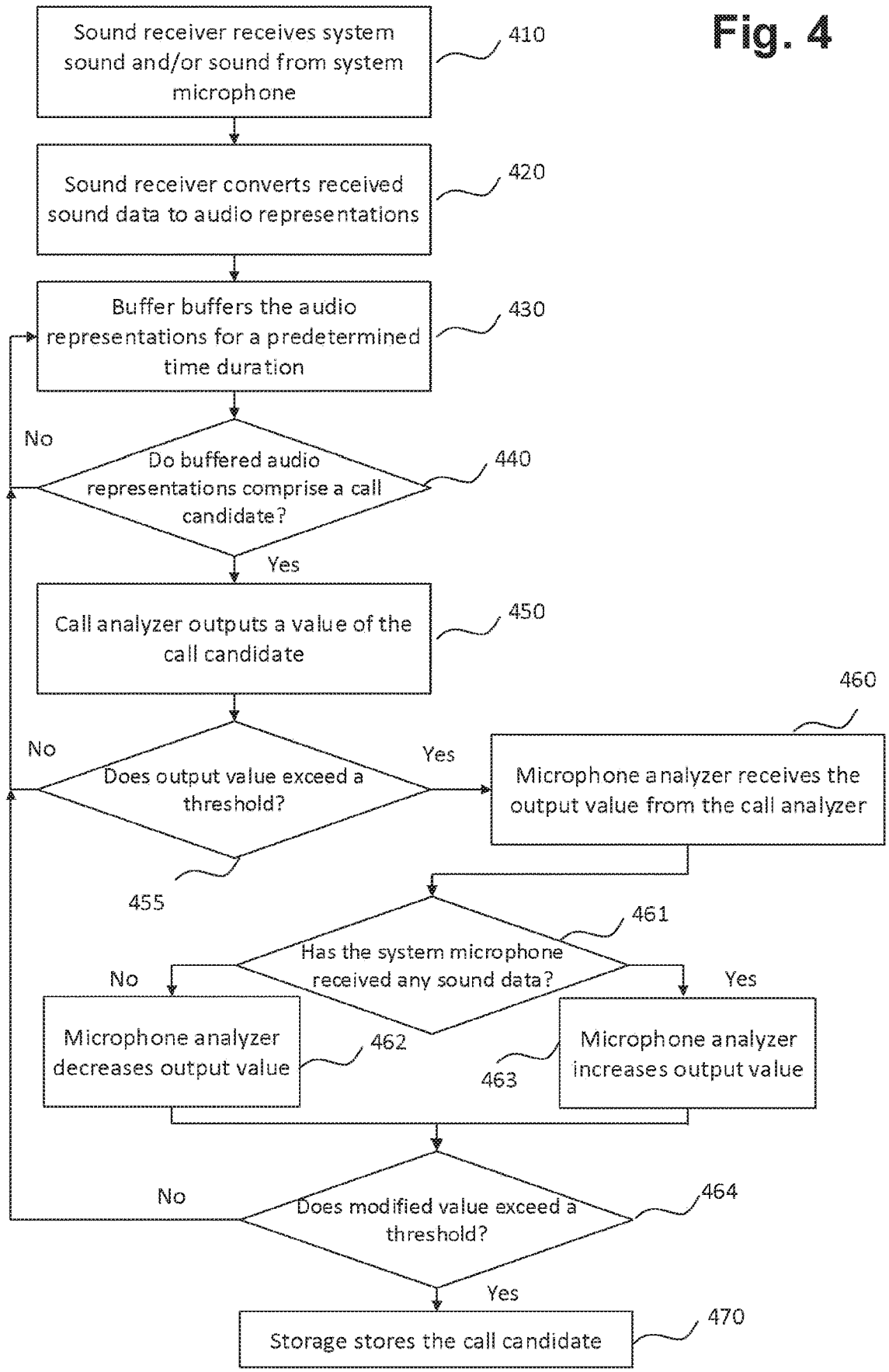
FIG. 4 is an illustration of a method for automatically storing of a call, wherein both the call analyzer and the microphone analyzer are used to analyze the call candidate.

The call recording system 300 of FIG. 3 is further described in view of the method as illustrated in FIG. 4. Steps 410 to 440 and step 470 of FIG. 4 are equal to steps 210 to 240 and step 270 of FIGS. 2A to 2C. Thus, a detailed description of these steps is omitted at this point with regard to FIGS. 2A to 2C.

At step 450, the call analyzer outputs a value of the call candidate by using the rules based model 141 and/or the trained ML model 142 which has been described in more detail with regard to FIGS. 2A to 2C. Thus, a detailed description of the call analyzer 140 is omitted at this point.

If the call analyzer determines that a call candidate is a call ("Yes" at step 455 and described in more detail with regard to FIGS. 2A to 2C), the call analyzer is passed on to the microphone analyzer 345.

At step 460, the microphone analyzer 345 receives the output value of the call candidate from the call analyzer and determines at step 461 if the system microphone has received any sound data, i.e. if the sound receiver 110 has received system mic sound besides system sound. In other words, the microphone analyzer 345 determines if an audio representation of the call candidate corresponds to sound data from a system microphone.

In a next step, the microphone analyzer 345 may modify the value received from the call analyzer 140 based on if the audio representation of the call candidate corresponds to sound data from the system microphone. If no system mic sound exists ("No" at step 461), the microphone analyzer 345 may decrease the output value of the call candidate at step 462. If system mic sound has been detected and thus exists in the call recording system 300 ("Yes" at step 461), the microphone analyzer 345 may increase the output value of the call candidate at step 463.

At step 464, the microphone analyzer 345 determines if the output value modified by the microphone analyzer 345 exceeds a threshold. If the modified output value of the call candidate exceeds the threshold ("Yes" at step 464), the storage 150 stores the call candidate as call, i.e. as active call. If the modified output value of the call candidate does not exceed the threshold ("No" at step 464), the call candidate is discarded, i.e. not stored by the storage 150.

There are many options how to modify the output value of the call candidate. If the output value of the call candidate is a binary value, for example 0 for discarding the call candidate and 1 for storing the call candidate, the microphone analyzer 345 may modify the output value of the call candidate from 1 to 0 to indicate that the call analyzer represents a video stream and no actual conversation.

If, however, non-binary values are used for the call candidate, the microphone analyzer 345 may increase/decrease the output value and may compare the modified output value to a threshold to decide if the call candidate shall be stored.

By integrating the microphone analyzer 345 into the call recording system 300, the accuracy for classifying the call candidate into active call to be stored and non-active call to be discarded can be increased.

FIG. 5 illustrates a call recording system 500 which is equal to the call recording system 100 and 100' of FIGS. 1A and 1B but further comprises the MFCC generator 535 as briefly mentioned above and a distinguishing unit 545 including an acoustic biometric model.

The MFCC generator 535 generates MFCC audio representations of the audio representations of the call candidate being input into the MFCC generator 535. The MFCC generator 535 may be used to preprocess the audio representations into MFCCs. The MFCC generator 535 is particularly important during the running mode of the trained ML model 142 if the trained ML model 142 has been trained during the training mode on audio representations preprocessed into MFCCs.

It is noted that the location of the MFCC generator 535 is exemplified in FIG. 5 and it is not mandatory to place the MFCC generator 535 after the call candidate determination unit 130 as illustrated in FIG. 5. There are different options how to integrate the MFCC generator 535 in the call recording system 500. For instance, the MFCC generator 535 may be placed after the sound receiver 110, right before the call analyzer 140, or may be even part of the call analyzer 140.

The distinguishing unit 545 comprises an acoustic biometric model which distinguishes between different call candidates by comparing a selected call candidate with its preceding call candidate. Thus, the acoustic biometric model determines the start and ending of one call candidate such that the stored call candidates can be divided into separate call logs for later retrieval.

To achieve the distinction between two different calls, the acoustic biometric model may distinguish between to separate voices as the assumption is that a new vocal profile implies a new call. This is only effective in cases where there is one participant on one channel, i.e. if more than one participant talks on the same channel the acoustic biometric model returns false results. However, there is an option that the participants are asked by the call recording system 500 to name the number of participants on one end of the call when the system detects distinct voice profiles which are active within a small time frame of for example a few seconds.

The acoustic biometric model may extract MFCCs of a selected call candidate, may determine the x-vector of the selected call candidate and may compare the x-vector of the selected call candidate with the x-vector of its preceding call candidate. In more detail, the acoustic biometric model may operate by extracting MFCCs of the vocal profile of a participant and by determining its x-vector. The x-vector of the participant's acoustic sample, i.e. audio representation, is compared to the last x-vector of the preceding acoustic sample, i.e. audio representation. If there is a considerable difference between one conversation segment to the next conversation segment, the acoustic biometric model determines that there are two distinct speakers. Thus, the recorded, i.e. stored, call candidate, i.e. the active calls, may be labelled as two separate calls to be stored.

Figure 6B:
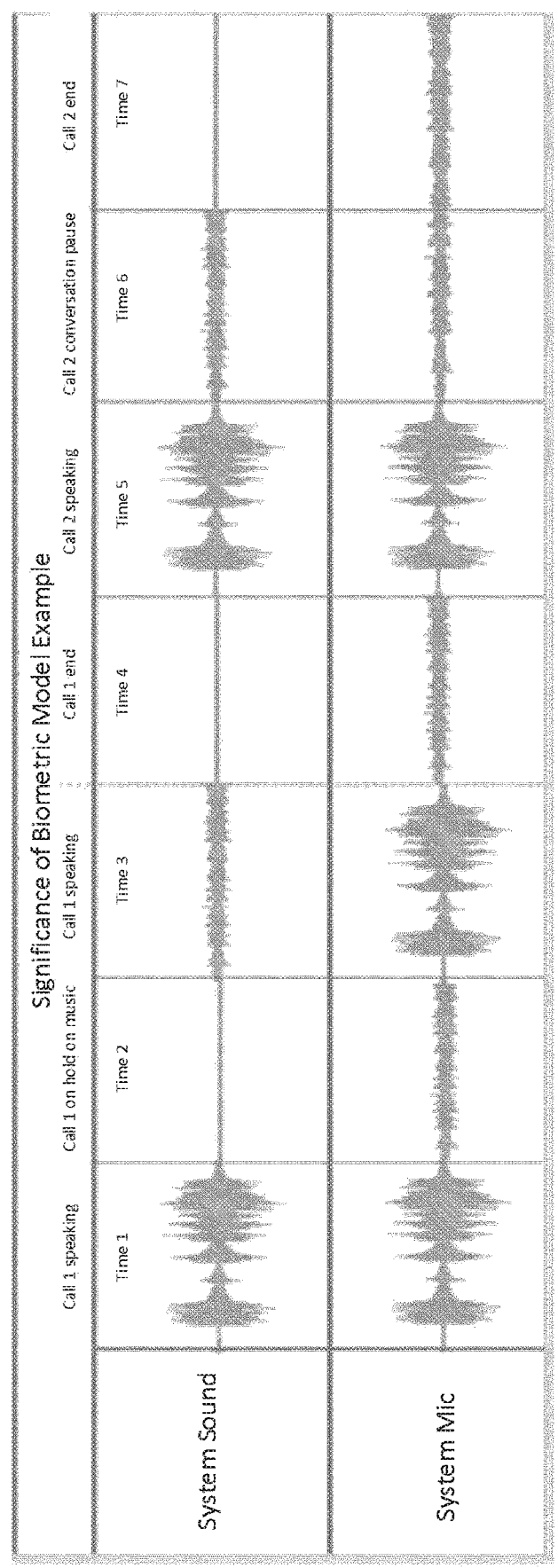
FIG. 6B is an illustration of the significance of a biometric model example to distinguish between two different calls.

Examples of acoustic samples, i.e. audio representations, and call candidates to be stored are shown in FIGS. 6A and 6B. FIG. 6A thereby illustrates audio representations of system sound in one row and audio representations of system mic sound in a second row. The x-axis of FIG. 6A represents time, while the y-axis of FIG. 6A represents the amplitude of the audio representations corresponding to the intensity of the underlying sound data. From FIG. 6A the differences between an agent listening to music, an agent speaking to a client, etc. can be seen in the changes of the audio representation. In addition, it becomes clear that one call candidate consists of at least one audio representation.

In particular, FIG. 6A gives an example of an agent and a client, wherein the agent listens to some music and then ends the music to make a call. During the call, the audio representations show that the agent speaks to a client and is then being placed on hold with waiting music. After the client has returned to the conversation, the conversation ends and the agent resumes listening to music. As indicated by the audio representations in the system sound and system mic, the system microphone is always receiving some ambient noise. The class recording system 500 with the underlying classification model, i.e. the rules based model 141 and/or the trained ML model 142, is nevertheless able to determine that the system sound being received in time frame 3 is ambient noise and that the call is still running.

The same setting of FIG. 6A is also used for FIG. 6B illustrating the significance of the acoustic biometric model. As described above, one row represents system sound, while a second row represents system mic sound. The x-axis of FIG. 6B corresponds to time, while the y-axis represents the amplitude of the audio representations corresponding to the intensity of the underlying sound data. FIG. 6B demonstrates how the acoustic biometric model distinguishes between two different callers. Call 1 commences in time frame 1 and ends in time frame 4, while call 2 starts in time frame 5 and ends in time frame 7. The acoustic biometric model is able to determine that the x-vector of the MFCCs of the system sound vocal characteristics is different between time frame 3 and time frame 5, thus marking the calls as separate calls.

Figure 7:
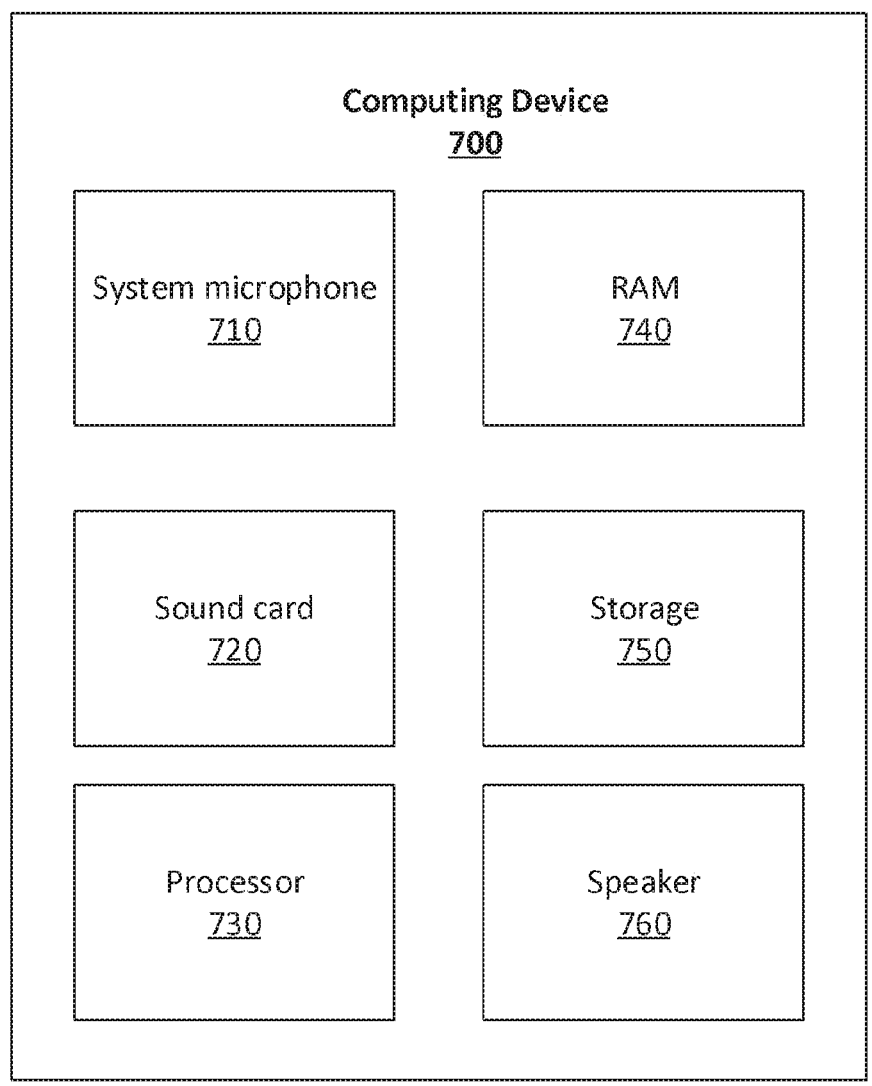
FIG. 7 is an illustration of a computing device, the computing device including a system microphone, a sound card, a processor, a Random Access Memory (RAM), a storage, and a speaker.

FIG. 7 illustrates a computing device 700 which may be a personal computing device such as a desktop computer or laptop computer. The computing device 700 may comprise a system microphone 710, a sound card 720, a processor 730, e.g. a microprocessor of a personal computer, a RAM 740, a storage 750, and a speaker 760.

The call recording systems 100, 100', 300, or 500 may run on the computing device 700, wherein the system microphone 710 may receive sound data of a user speaking into the system microphone 710 of the computing device 700. The sound card 720 may comprise the sound receiver 110 and may thus receive system sound and system mic sound of the call recording system. The processor 730 may analyze the sound data and may determine if buffered audio representations buffered in the RAM 740 being equal to the buffer 120 comprise call candidates. In addition, the processor 730 may analyze if the call candidate is a call to be stored. In detail, the processor is configured to carry out the functions of the call candidate determination unit 130 and the call analyzer 140. If the call candidate is a call to be stored, it is stored in the storage 750 of the computing device 700. The speaker 760 of the computing device 700 outputs sound to the user of the computing device 700.

With regard to FIG. 7, it is noted that the call recording systems 100, 100', 300, or 500 may be integrated in the operating system of the computing device 700. Since the call recording system can exist on a local machine, like the computing device 700, it is not necessary to integrate the call recording system for automatically recording a call candidate with any third party software. Thus, the call recording system can be independently configured on the computing device 700 thereby reducing the complexity and cost of configuring the call recording system. In addition, the usage of bandwidth can be reduced, as the call recording system can be run locally on the computing device 700 without the need to communicate with an external server.

Figure 8:
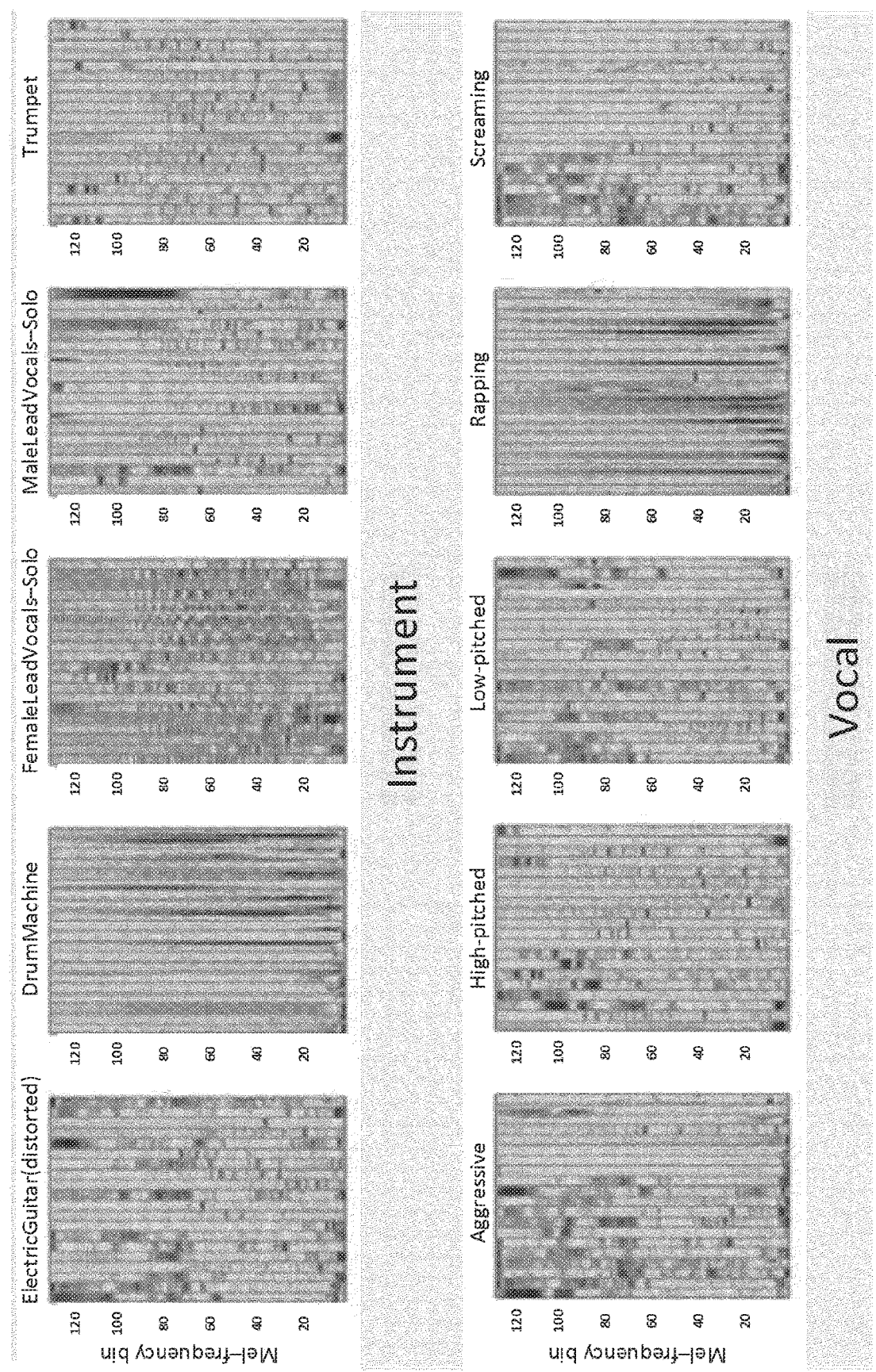
FIG. 8 is an illustration of Mel-frequency bins in relation to different instrument samples and vocal samples.

FIG. 8 illustrates different instrument samples and vocal samples to visualize how the MFCCs of audio representations can be used to differentiate between, for example, sound data from an electric guitar or sound data from the speech of a participant. The x-axis of each box representing different sound data represents time, while the y-axis of each box represents Mel-frequency co-coefficients. The color coding of the boxes in the MFCC representation indicates intensity.

In summary of the description given with FIGS. 1 to 8, the skilled person will be aware of the advantages resulting from the present solution disclosed herein. The call recording system and method for automatically recording calls is independent of VoIP providers and Customer Relationship Manager (CRM) providers, as the call recording system and method can be integrated onto any system independently of what kind of software or infrastructure is being used to make the calls to be stored. The inventive concepts represent a plug and play implementation independent of a change in the communication protocols to automatically record calls. In addition, the solution provided herein is related to reduced processing demands compared to keyword detection means. This means that the proposed call recording system and method can be implemented on less processor intensive machines. Alternatively it means the solution can be provided on a local machine, without needing to outsource the processing to a remote cloud based server, which is usually the status quo when operating a transcription model which would be the case for detecting keywords. The benefits to locally store the calls is described in more detail below:

1) It is possible to provide a workaround from a monopoly of VoIP providers resulting in less labor to set up a call recording system while reducing costs.
2) Bandwidth is saved compared to solutions which communicate with other servers in order to trigger a recording function to store a call.
3) Processing power is saved compared to solutions which depend on speech analysis methods of triggering a recording function. Thus, it is possible to run the call recording system on computing devices with less processing power and capacity.
4) Access can be easily given to small operators, like private practicing doctors or lawyers who do not have the technical capacity or time investment to integrate their computing devices into a larger network to be able to record, i.e. store, calls.

In the following, several different scenarios and approaches will now be described to further illustrate the applicability of the present solution:

Scenarios that usually comprise call candidates to be stored as active call are an agent speaking to a client while the client is quiet; an agent waiting on hold while the system sound plays call-waiting music, a client speaking to an agent while the agent is quiet; an agent waiting on hold while the system sound plays silence; and a long conversational pause. In contrast thereto, scenarios comprising call candidates that should not be recorded are an agent listening to multimedia without any call being active; and an agent idle with no call being active.

With additional models, like the trained ML model 142, which can classify system sounds, the scenarios are able to be accurately defined and can be automatically cut out of the recording when they do not include content to be stored.

The call recording system automatically commences recording of a call if system sound has been detected for the rules based model 141 or if the system sound has been determined as a conversation for the trained ML model 142. Moreover, the call recording system automatically commences recording of a call if the microphone analyzer 345 has detected voice activity.

The call recording system automatically stops recording of a call in the following scenarios:

If system sound and system mic sound are no longer detected for a time duration of longer than a predetermined amount of time, usually between 5-10 seconds depending on the context of the types of calls.

If the system sound is not classified as conversation and the microphone is not detecting voice activity for a time duration of longer than a predetermined amount of time, usually between 5-10 seconds depending on the context of the types of calls. The exception to this is the case of call-waiting music being played to an agent, where the classification model will determine the system sound to be non-conversational. To overcome this false reading, a user can be prompted to identify whether a call is still active when music is identified at a time that is unusual, i.e. directly after voice activity has been detected on the system microphone and system sound.

It is also possible that the call recording system including the trained ML model 142 can overcome false readings. For the rules based model 141 there are usually no false readings due to the simplicity of the environment which makes it possible to accurately define the rules. The following scenarios show how potential false readings of the trained ML model 142 can occur and how they can be overcome:

If a client is put on hold without any music, the silence could prompt the recording to stop. To overcome this, the acoustic biometric model will be applied to the vocal profiles of clients on either side of the system sound pause. If the vectors of the biometric profiles of the clients on either side of the silence are different, it is implied that there are two distinct calls, and the call candidate can be divided into two separate call recordings. If the client biometric profiles of the clients on either side of the system sound pause are the same, then the call candidate will be labelled with the same call identification resulting in one stored call. For this reason, having a longer buffer is useful since the recording can retrieve and store sound data before a long on hold silence was detected for later retrieval.

If there is a longer pause in a conversation without any sound data detection on either end of the conversation, it could be mistaken for the end of a call. However, there could still be background noise on the system sound rather than complete silence if the caller on the other side is not speaking. This is where the trained ML model 142 has been trained on background ambient noise to be able to determine background ambient noise in a call candidate and therefore to be able to distinguish between silence corresponding to an ended call and silence corresponding to a break in a conversation. The acoustic biometric model can also identify whether a new participant is present after the pause, thereby defining the recording as different calls.

If an agent plays a video, podcast or other multimedia which contains conversational audio on the computing device, the microphone analyzer 345 is useful to determine whether system mic sound from the system microphone is available. If system sound is detected for a long time duration without any system mic sound being detected, the call recording system determines the call candidate to be a non-active call not to be stored.

In addition to the described systems and methods, according to another embodiment, a computer program or computer program product is defined. The computer program or computer product includes instructions adapted to cause data processing means to carry out the steps of one of the call recording methods described above, e.g. with respect to FIGS. 2*a* to 2C and 4.

Use Case Relating to a Small Doctor's Office:

In addition, a use case example of a small doctor's office with a call recording system according to inventive concepts is given:

A small doctor's office with one general medical practitioner and one receptionist may be operating a legacy land-line phone system to handle incoming and outgoing calls. Generally the receptionist operates the phone lines with incoming calls consisting of patients making appointments, and outgoing calls consisting of the receptionist or medical practitioner following-up on a medical appointment.

The patients making incoming calls to the small office may express symptoms while requesting an appointment. The receptionist may also ask for additional details of the health concerns of the patients for pre-screening and preparation to pass on to the medical practitioner to make the medical appointment more streamlined and efficient. The follow-up outgoing calls, or additionally over-the-phone medical advising services performed by the medical practitioner, may also contain medical information relating to the health of the patients.

When the receptionist is receiving or making the calls to the patients, the receptionist desires to record the calls especially in the case where medical information is disclosed. The patients' health related recorded audio data can be relayed to the medical practitioner for further diagnosis. For the outgoing calls where the medical practitioner is providing a remote medical service via a phone, the call should be recorded for diagnosis purposes or for reviewing purposes.

To keep up with technological trends, the medical practitioner wishes to upgrade the legacy land-line phone system to enable patients to communicate with the office via the internet as well as via a phone land-line. The doctor also wishes to record the calls for the reasons listed above.

Typical solutions may include integrating a VoIP system with the doctor's office computer system, and enabling the staff at the small doctor's office to make and receive calls via the internet and via land-line. To enable recording over a VoIP network, one solution typically involves integrating some third party software to be able to record the VoIP calls. The limitation with these third party solutions is that they are custom tailored to one VoIP provider and may not be integrated with the land-line phone system that is installed on the computing system. Some VoIP providers also have recording solutions which are triggered via a middle point between the caller and call receiver. The recordings may be stored on a remote system operated via the VoIP provider usually on a cloud computing system resulting in problems related to privacy reasons and confidential data. The doctor may wish to keep the confidential medical records on the premises, rather than contracting a VoIP provider to record the call content via a remote system.

The doctor may hope to achieve the capacity of recording calls across multiple VoIP platforms, and locally store the medical confidential records of the calls. To this end, the small doctor's office can implement the call recording system and method for automatically recording a call as described in more detail above on their computing system, i.e. computing devices. The call recording system may then automatically trigger the recording, i.e. storing, of a call when a call to be stored is being detected regardless of VoIP technologies being used or land-line technologies being implemented on the computing system. The recorded calls may also be stored locally to satisfy any potential privacy and confidential requirements. The automated recording of a call additionally comes with the benefit of circumventing the need for the receptionist or doctor to manually trigger the recording which may be prone to human error.

Use Case Relating to a Call Center Company:

A call center company may operate a medium sized call center of around 100 employees making inbound customer service inquiries and outbound sales calls. The call center company has procured the services of a VoIP service provider and a customer relationship manager (CRM) in order to make high volume inbound and outbound calls. The call center company may wish to analyze the calls in order to achieve higher efficiency and to train their employees on best practices for customer service and sales. To achieve these goals, the call center company must record their calls to provide analysis and further feedback to the call center agents.

The CRM offers basic call analysis feedback which is not sufficient for the purposes of the call center company. Typically CRM software and VoIP providers are already integrated with each other via partnerships prior to being procured by a client. However, a call analysis provider may offer much more in depth call analysis and feedback and may thus be an upgrade on the offering of the existing CRM.

The typical means of recording a VoIP call is via the VoIP provider. However, the call center company does not have a package with the VoIP service provider which may include a recording function for their calls. The call analysis provider which offers much more in depth call analysis is able to provide analysis on calls such that the call center company would like to procure their services. Unfortunately, the call center company does not have any other option but to record their calls by upgrading their service plan with the VoIP service provider which may incur further costs and integration time. In this matter, there is a demand for an automatic call recording function, i.e. a call recording system, which operates independent of the VoIP provider.

The call analysis provider may implement the automatic call recording technology, i.e. the call recording system as has been described in more detail above, on the prospective call center's local machines. This technology may enable a workaround of the VoIP provider's capacity to offer a recording service. In addition, the call recording system may enable the benefits of recording onto local machines rather than via a middle point which VoIP providers normally do.

With the capacity to automatically record calls, the call center company can provide the call analysis provider with data related to their calls. The VoIP provider may be still required in order to facilitate the call function, and the CRM provider may still be required for logging of the calls. However, with this recording function, the call center company can seamlessly record their calls. Since the recordings are stored locally and on-site, the call center company can seamlessly provide the call data to the call analysis provider without the need to integrate with the CRM and VoIP providers.

The call recording systems and methods herein are not limited to these scenarios as described in detail above. As described above, embodiments and examples of the present solution allow for reliably and automatically recording of active calls. Thus providing a simple solution to the needs of particularly small companies desiring to keep a record of their calls.

It will be appreciated that various modifications and variations can be made in the described systems and methods as well as in the construction of embodiments of this invention without departing from the scope or spirit of the invention.

The invention has been described in relation to particular embodiments and examples which are intended in all aspects to be illustrative rather than restrictive.

Moreover, other implementations of the invention will be apparent to the skilled person from consideration of the specification and practice of the invention disclosed herein. It is intended that the specification and the examples be considered as exemplary only. To this end, it is to be understood that inventive aspects lie in less than all features of the foregoing disclosed implementation or configuration. Thus, the true scope and spirit of the invention is indicated by the following claims.

What is claimed is:

1. A call recording system for automatically storing of a call, the call recording system comprising:
   a sound receiver configured to receive sound data and to convert sound data to audio representations of sound;
   a buffer configured to buffer the audio representations of sound for a predetermined time duration;
   a call candidate determination unit configured to determine if the buffered audio representations comprise a call candidate, wherein the buffered audio representations comprise a call candidate if a characteristic of a buffered audio representation exceeds a first predetermined threshold;
   a call analyzer configured to analyze the call candidate, wherein the call analyzer is configured to output a value of the call candidate and to determine from the audio representations of the call candidate if the output value corresponding to the call candidate exceeds a second predetermined threshold;
   a storage configured to store the call candidate as a call if the value of the call candidate exceeds the second predetermined threshold;
   a microphone analyzer configured to receive the value output by the call analyzer, when the value output by the call analyzer exceeds the second predetermined threshold, to determine if an audio representation of the call candidate corresponds to sound data from a system microphone to modify the value received from the call analyzer based on if the audio representation of the call candidate corresponds to sound data from the system microphone and to determine if the modified value exceeds a fourth predetermined threshold; and
   the storage configured to store the call candidate as a call if the modified value corresponding to the call candidate exceeds the fourth predetermined threshold.

2. The call recording system of claim 1, wherein the call analyzer comprises
   a trained Machine Learning (ML) model configured to output a probability as the value of the call candidate and the call analyzer is configured to determine if the output probability corresponding to the call candidate exceeds the second predetermined threshold.

3. The call recording system of claim 1, wherein the call analyzer comprises
   a rules based model configured to output a time duration as the value of the call candidate, and the call analyzer is configured to determine if the output time duration corresponding to the call candidate exceeds the second predetermined threshold.

4. The call recording system of claim 3, wherein the call analyzer is configured to determine that the call candidate corresponds to an error message output on a computing device if the output time duration is smaller than the second predetermined threshold.

5. The call recording system of claim 1, the call analyzer comprising a rules based model and a trained ML model
   wherein the rules based model is configured to output a time duration as the value of the call candidate and the call analyzer is configured to determine if the output time duration corresponding to the call candidate exceeds the second predetermined threshold; and
   wherein, if the output time duration corresponding to the call candidate exceeds the second predetermined threshold, the trained ML model is configured to output a probability as the value of the call candidate and the call analyzer is configured to determine if the output probability corresponding to the call candidate exceeds a third predetermined threshold; and
   the storage configured to store the call candidate as a call if the probability corresponding to the call candidate exceeds the third predetermined threshold.

6. The call recording system of claim 2, wherein the trained ML model has been trained on a training set of a plurality of audio representations including call candidates associated with labels, wherein the labels indicate which audio representations are to be stored and which are not to be stored.

7. The call recording system of claim 2, wherein the trained ML model comprises a Convolutional Neural Network (CNN).

8. The call recording system of claim 1, further comprising a distinguishing unit comprising an acoustic biometric model configured to distinguish between different call candidates by comparing a selected call candidate with its preceding call candidate.

9. The call recording system of claim 1, further comprising a Mel-frequency cepstral coefficient (MFCC) generator configured to preprocess the audio representations into MFCC audio representations.

10. The call recording system of claim 8, wherein the acoustic biometric model is configured to extract MFCCs of the selected call candidate, to determine the x-vector of the selected call candidate and to compare the x-vector of the selected call candidate with the x-vector of its preceding call candidate.

11. The call recording system of claim 1, the call recording system being integrated in the operating system of a computing device.

12. The call recording system of claim 1, wherein the sound data received by the sound receiver comprises system sound or sound from the system microphone.

13. The call recording system of claim 1, wherein the characteristic of the buffered audio representation indicates the intensity of the sound corresponding to the sound data.

14. A call recording method for automatically storing of a call, the call recording method comprising:
   receiving sound data;
   converting the sound data to audio representations of sound;
   buffering the audio representations of sound for a predetermined time duration;
   determining if the buffered audio representations comprise a call candidate, wherein the buffered audio representations comprise a call candidate if a characteristic of a buffered audio representation exceeds a first predetermined threshold;
   analyzing the call candidate, wherein the step of analyzing comprises outputting a value of the call candidate and determining from the audio representations of the call candidate if the output value corresponding to the call candidate exceeds a second predetermined threshold;

storing the call candidate as a call if the value of the call candidate exceeds the second predetermined threshold;

receiving the output value when the output value exceeds the second predetermined threshold, to determine if an audio representation of the call candidate corresponds to sound data from a system microphone to modify the output value based on if the audio representation of the call candidate corresponds to sound data from the system microphone and to determine if the modified value exceeds a fourth predetermined threshold; and storing the call candidate as a call if the modified value corresponding to the call candidate exceeds the fourth predetermined threshold.

15. A call recording system for automatically storing of a call, the call recording system comprising:

a sound receiver configured to receive sound data and to convert sound data to audio representations of sound;

a buffer configured to buffer the audio representations of sound for a predetermined time duration;

a call candidate determination unit configured to determine if the buffered audio representations comprise a call candidate, wherein the buffered audio representations comprise a call candidate if a characteristic of a buffered audio representation exceeds a first predetermined threshold;

a call analyzer configured to analyze the call candidate, wherein the call analyzer is configured to output a value of the call candidate and to determine from the audio representations of the call candidate if the output value corresponding to the call candidate exceeds a second predetermined threshold;

a storage configured to store the call candidate as a call if the value of the call candidate exceeds the second predetermined threshold; and a distinguishing unit comprising an acoustic biometric model configured to distinguish between different call candidates by comparing a selected call candidate with its preceding call candidate;

wherein the acoustic biometric model is configured to extract MFCCs of the selected call candidate, to determine the x-vector of the selected call candidate and to compare the x-vector of the selected call candidate with the x-vector of its preceding call candidate.

* * * * *